United States Patent
Chang et al.

(10) Patent No.: US 9,902,881 B1
(45) Date of Patent: Feb. 27, 2018

(54) PHOTOSENSITIVE ADHESIVE

(71) Applicant: Plastics Industry Development Center, Taichung (TW)

(72) Inventors: Kai-Chieh Chang, Taichung (TW); Chen-Yu Li, Taichung (TW); Wei Lin, Taichung (TW); Yao-Kuei Hsiao, Taichung (TW)

(73) Assignee: Plastics Industry Development Center, Taichung (TW)

( * ) Notice: Subject to any disclaimer, the term of this patent is extended or adjusted under 35 U.S.C. 154(b) by 0 days.

(21) Appl. No.: 15/362,860

(22) Filed: Nov. 29, 2016

(51) Int. Cl.
*C08F 20/26* (2006.01)
*C08G 61/04* (2006.01)
*C09J 135/02* (2006.01)

(52) U.S. Cl.
CPC .................................. *C09J 135/02* (2013.01)

(58) Field of Classification Search
None
See application file for complete search history.

(56) References Cited

U.S. PATENT DOCUMENTS

2013/0224418 A1* 8/2013 Kiuchi .................. C09J 7/0225
428/41.8

FOREIGN PATENT DOCUMENTS

JP 09-197658 * 7/1997

OTHER PUBLICATIONS

Kokuni, JP 09-197658 Machine Translation, Jul. 31, 1997.*
Kokuni, SciFinder Reference Summary, Jul. 31, 1997, 2 pages.*

* cited by examiner

*Primary Examiner* — Jessica Whiteley
(74) *Attorney, Agent, or Firm* — Alan D. Kamrath; Kamrath IP Lawfirm, P.A.

(57) ABSTRACT

A photosensitive adhesive is polymerized by a cinnamate monomer and a monomer A. By irradiating under different light waves, triggering reversible cyclization causes the adhesion force of the adhesive to change. The adhesion force change is repeatable. Therefore, the efficiency of the manufacture process would increase, and the cost of material would be reduced.

2 Claims, No Drawings

PHOTOSENSITIVE ADHESIVE

FIELD OF THE INVENTION

The present invention is related to an adhesive and, especially, to an adhesive with various adhesive abilities under certain lightwaves.

DESCRIPTION OF THE RELATED ART

UV tape or photo-release tape is used as a temporary adhesive when touch panels or pad panels are manufactured. The conventional photo-release tape may strip from the panel by polymerization or release air to decrease the adhesive when exposed to certain lightwaves.

Polymerization is performed by an acrylic adhesive reacting with a photo-crosslink agent. After irradiating under certain light waves, the photo-crosslink agent initiates the polymerization and forms a crosslink structure inside the acrylic adhesive to decrease the adhesion force.

Air-release type photo-release tape releases air, such as nitrogen gas, after irradiating certain light waves to decrease the adhesion force for peeling from the panels.

However, the reaction of the conventional photo-release tape is irreversible after being irradiated by light waves. The adhesion force of the conventional tape could not be returned after being used, so the conventional tape is a disposable product. Therefore, using the conventional photo-release tape during a panel manufacture process leads to a high cost, and the process of manufacture is also complicated.

SUMMARY OF THE INVENTION

For solving the above-mentioned disadvantages, the present invention is related to a photosensitive adhesive and an application thereof.

The present invention provides a photosensitive adhesive which is polymerized by a cinnamate and a monomer A. The photosensitive adhesive shows a formula (1) structure under light waves in a range of 200 to 280 nm. Two cinnamate parts in two formula (1) structures are cyclized to form a formula (2) structure under light waves in a range of 280 to 400 nm. The cyclization is reversible. The monomer A shown in the formula (1) and the formula (2) structures includes an acrylate monomer. The adhesion force of the formula (2) structure is lower than the formula (1) structure. The formula (1) structure is:

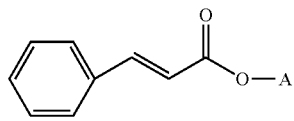

The formula (2) struction is:

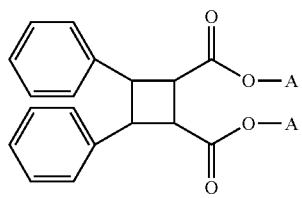

The present invention shows the following advantages, such as:

1. By being irradiated under different light waves to trigger a reversible cyclization, the adhesion force of the adhesive of the present invention could be changed when peeling or becoming a re-adhesive. Therefore, the efficiency of the manufacture process would increase, and the cost of material would be reduced.

2. The cyclization of cinnamates of the formula (1) and formula (2) structures are triggered by being irradiated under a certain light wave disclosed by the present invention, and the degree of cyclization and crosslinking might be controlled by light energy to reach the purpose of controlling the adhesion force of the present invention.

DETAILED DESCRIPTION OF THE INVENTION

The present invention provides a photosensitive adhesive which is polymerized by a cinnamate and a monomer A as shown in a formula (1) structure. The photosensitive adhesive shows the formula (1) structure under light waves in a range of 200 to 280 nm. Two cinnamate parts of two formula (1) structures react with each other to form a reversible cyclization of a formula (2) structure under light waves in a range of 280 to 400 nm. The monomer A shown in the formula (1) and formula (2) structures may be polyurethane monomer or acrylate monomer, and the adhesion force of the formula (2) structure is lower than the formula (1) structure. The formula (1) structure is:

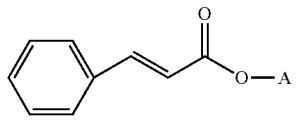

The formula (2) structure is:

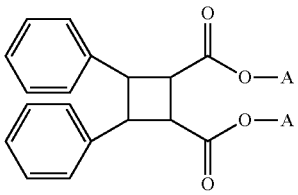

In a first preferred embodiment of the present invention, the monomer of the monomer A is polyurethane monomer. The synthesis method comprises esterification of cinnamic acid as formula (3) with a diol as formula (4) to form cinnamate as formula (5) with an alcohol group at each end of the structure. The cinnamic acid as formula (3) comprises an extra alcohol group on its benzene ring. The cinnamate as formula (5) when polymerized with an isocyanate monomer forms a polyurethane pre-polymer as formula (6). Instead of the para-position as shown in formula (5), the alcohol group on the benzene ring might further be ortho-positioned as shown in formula (5b) or meta-positioned as shown in formula (5c) of the long chain. The position of the alcohol group of the formula (5) depends on the position of the alcohol group on the benzene ring of the cinnamic acid as formula (3), which is not limited.

n of formula (4) and formula (3) might be 2 or 6, the diol of formula (4) might be glycol or 1,6-Hexanediol. $R_1$ group of formula (6) which might be isocyanate monomer as mentioned above, and $R_2$ group of formula (6) might be a cinnamate of formula (5). Formula (3) is:

Formula (4) is:

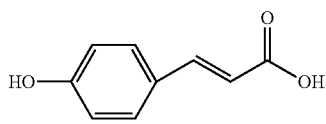

Formula (5) is:

HO—⟨phenyl⟩—CH=CH—C(=O)—O—(CH₂)ₙ—OH

Formula (5b) is:

⟨2-hydroxyphenyl⟩—CH=CH—C(=O)—O—(CH₂)ₙ—OH

Formula (5c) is:

HO—⟨3-hydroxyphenyl⟩—CH=CH—C(=O)—O—(CH₂)ₙ—OH

Formula (6) is:

$$OCN-R_1-NHCOO-R_2-OOCNH-R_1-NCO$$

Isocyanate of polyurethanes monomer might come from TDI (Toluene Diisocyanate), MDI (Methylene Diphenyl Dissocyanate), PDI (PentamethyleneDiisocyanate), XDI (XyleneDiisocyanate), TOPI (TrifuoromethoxyPhenyl Isocyanate), PMDI (Polymeric Methylene Diphenyl Dissocyanate), DDI (DimerylDiisocynante), HDI (Hexamethyl-eneDiisocyanate), IPOI (IsophoronDiisocyanate), $H_{12}MDI$ (4,4-Methylene Diphenyl Dissocyanate), CHDI (Cyclohexane-1,4-Diisocyanate), $H_6XDI$ (Hydrogenated XyleneDiisocyanate) or TMXDI (TetramethylxyleneDiisocyanate).

Polyurethane pre-polymer as formula (6) may further react with a chain extender as formula (7) to form the first preferred embodiment of the present invention. The chain extender of formula (7) might further comprise a linear alkane with an alcohol group (OH group) at two ends as shown in formula (7a), or a linear alkane with an amino group ($NH_2$ group) at two ends as shown in formula (7b). $R_3$ group shown in formula (7a) and formula (7b) might be a linear alkane of the chain extender as formula (7). Formula (7a) is:

$$HO-R_3-OH$$

Formula (7b) is:

$$H_2N-R_3-NH_2$$

Formula (8) is:

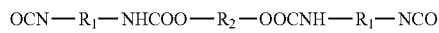

In the first preferred embodiment of the present invention, formula (8) is triggered by light stimulation. In the present invention, the term "light stimulation" refers to, after irradiation of two structures of formula (8) under certain light waves, adjacent unsaturated bonds of the benzene ring of the cinnamate parts in two formulas (8) would perform a reversible cyclization to form formula (9). Therefore, the intramolecular crosslinking degree of the present invention will change, and lead to adhesion force and stickiness change. Formula (9) is:

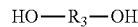
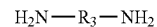

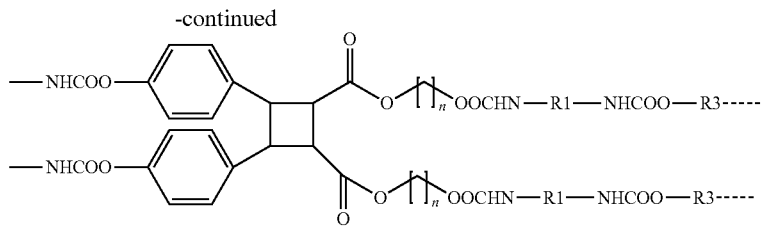

When irradiation is performed under a range of 200 nm to 280 nm (UV light), cyclization of formula (8) could not be activated. When irradiation is performed under a range of 280 nm to 400 nm, an adjacent unsaturated bond of the benzene ring of two cinnamate parts in two formula (8) would perform a reversible cyclization to form formula (9) which causes the adhesive of formula (9) to be enormously reduced. The adhesive of formula (9) is lower than formula (8). Further, when irradiation is performed again under the range of 200 nm to 280 nm (UV light), formula (9) reverses to formula (8) by de-cyclization, and the adhesion force restores. Therefore, the adhesive could be controlled by irradiating in different light waves. In a preferred embodiment of the present invention, n of formula (8) and formula (9) might be, but is not limited to, 1, 2, 3, 4 or above.

As shown in formulas (8) and (9), $R_1$ group might be an isocyanate monomer part, $R_2$ group might be a cinnamate part, and $R_3$ group might be a chain extender.

In a second embodiment of the present invention, the monomer of the monomer A is an acrylate monomer. The synthesis method comprises reacting cinnamic acid of formula (3) with 2-Hydroxyethyl Acrylate (2HEA) as formula (10) to form a cinnamate with a double bond at the end of the main chain as shown in formula (11). The cinnamic acid of formula (3) might or might not be included with an extra alcohol group on its benzene ring of the second embodiment of the present invention. The formula (11) is then polymerized with an acrylate monomer to form the second embodiment of the present invention as shown in formula (12). The acrylate monomer might be, but is not limited to, OBA (Propylene Glycol Mono-methyl Ether Acrylate, purchased from Shiny Chemical Industrial Co., Ltd., TW), BA (Butyl Acrylate), MMA (Methyl Methacrylate), EHA (Ethylhexyl Acrylate), GMA (Glycidyl Methacrylate) or AA (Acrylic Acid). X and Y shown in formula (12) refer to the number of the acrylate monomer, and n refers to the number of carbon. Formula (10) is:

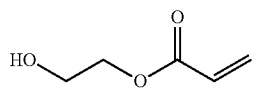

Formula (11) is:

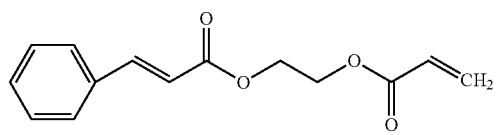 [SMILES: C=CC(=O)OCCOC(=O)/C=C/c1ccccc1]

Formula (12) is:

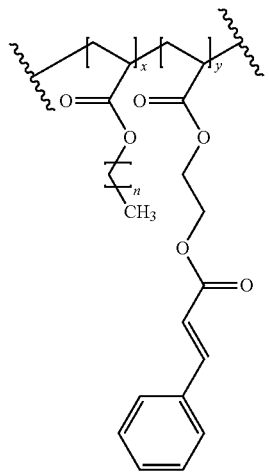

The second embodiment of the present invention is also a light triggered compound as is the above mentioned first embodiment of the present invention. When irradiation is performed under a range of 280 nm to 400 nm (UV light), the first unsaturated bond on the benzene ring of formula (12) will be triggered to perform reversible cyclization between two formulas (12). Thus, the intramolecular cross-linking degree of the second embodiment of the present invention will change and lead to an adhesion force and stickiness change.

When irradiation is performed under a range of 200 nm to 280 nm (UV light), cyclization of formula (12) could not be formed. When irradiation is performed under a range of 280 nm to 400 nm, the first unsaturated bonds next to the benzene ring of two formulas (12) would perform a reversible cyclization and lead the adhesive decrease. Further, when irradiation is performed again under a range of 200 nm to 280 nm (UV light), formula (12) performs de-cyclization, and the adhesive increases. Therefore, the adhesive could be controlled by irradiating different light waves.

Table 1 and Table 2 are the adhesive strength test for the first embodiment and the second embodiment of the present invention. The test methods comprise applying the adhesive disclosed in the first embodiment and the second embodiment on a 25 μm PET sheet with the thickness of the adhesive being about 25 μm. The test standard is applied by using PSTC-1 of the International adhesive/peeling force test. As shown in test results of Table 1 and Table 2, the adhesive could be controlled under different light wave irradiation after 5, 10 repeats, and the adhesive force reduces less than 5% even after 100 repeats. Therefore, the adhesive disclosed in the present invention show an excellent ability of repeatable use.

TABLE 1

Adhesive disclosed by the first embodiment of the present invention

| Repeated times | Adhesive under 200 nm to 280 nm irradiation (gf/in) | Adhesive under 280 nm to 400 nm irradiation (gf/in) |
| --- | --- | --- |
| 1 | 750 | 20 |
| 5 | 745 | 19 |
| 10 | 740 | 18 |
| 100 | 720 | 16 |

TABLE 2

Adhesive disclosed by the second embodiment of the present invention

| Repeated times | Adhesive under 200 nm to 280 nm irradiation (gf/in) | Adhesive under 280 nm to 400 nm irradiation (gf/in) |
| --- | --- | --- |
| 1 | 800 | 25 |
| 5 | 790 | 23 |
| 10 | 780 | 22 |
| 100 | 760 | 20 |

Table 3, shows the adhesive/peeling force test, which is the same as the above standard, performed on a conventional photo-release tape to further illustrate the excellent results of the present invention. Results show that the conventional photo-release tape could not be reused after irradiating under certain light waves after the second use.

TABLE 3

Adhesive of the conventional photo-release tape

| Repeated times | Adhesive under 200 nm to 280 nm irradiation (gf/in) | Adhesive under 280 nm to 400 nm irradiation (gf/in) |
| --- | --- | --- |
| 1 | 680 | 20 |
| 2 | 20 | 20 |
| 10 | 20 | 20 |
| 100 | 20 | 20 |

The adhesive disclosed by the present invention could be applied on the surface of a subject. When the subject is very small, such as a wafer, the adhesive may be applied on one or both surfaces of a plastic sheet for supporting the small subject thinly adhered on the adhesive of the present invention. The plastic sheet might be, but is not limited to, PET, OPP or BOPP.

The adhesive disclosed by the present invention is made of linear compounds crosslinked with cyclized compounds, and the structure of the polymerization compounds could be reversed under different light waves. Therefore, the intramolecular crosslinking degree of the present invention will change, so that the adhesion force and stickiness change.

Also, the present invention disclosed an adhesive and a method performed by light stimulation for cyclization to control the degree of crosslinking of polymers and the adhesion force of the adhesive.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

What is claimed is:

1. A photosensitive adhesive comprising:
a formula (1) structure under a light wave in a range of 200 to 280 nm and being polymerized by cinnamate monomers and acrylate monomers linked by 2-hydroxyethyl acrylate; and
a formula (2) structure under a light wave in a range of 280 to 400 nm and cyclized from two cinnamate monomers of two of the formula (1) structures;
wherein cyclization of the formula (1) structure is reversible, wherein an adhesion force of the formula (2) structure is lower than the formula (1) structure; and
wherein:
the formula (1) structure is

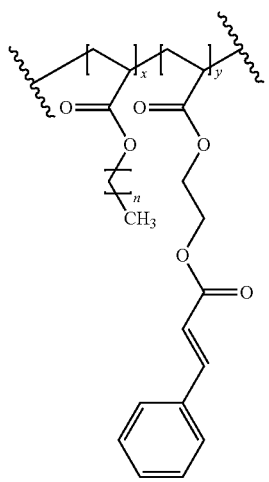

the formula (2) structure is

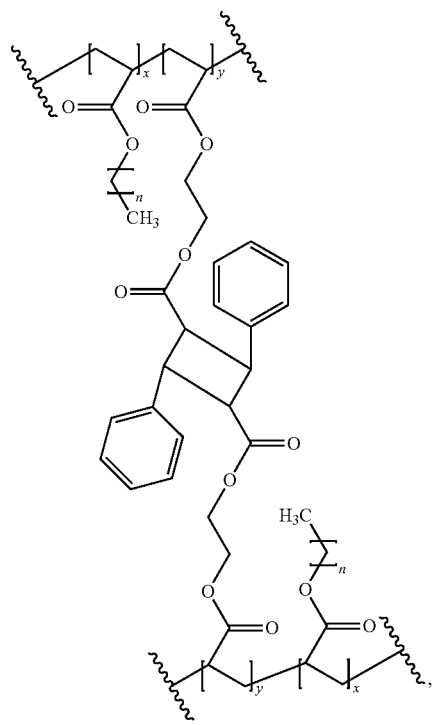

wherein x, y in the formula (1) structure and the formula (2) structure refer to numbers of the acrylate monomer, and n in the formula (1) structure and the formula (2) structure refer to a carbon number of each acrylate monomer.

2. The photosensitive adhesive as claimed in claim 1, wherein the acrylate monomer includes propylene glycol mono-methyl ether acrylate, butyl acrylate, methyl methacrylate, ethylhexyl acrylate, glycidyl methacrylate or acrylic acid.

* * * * *